Figure 1:
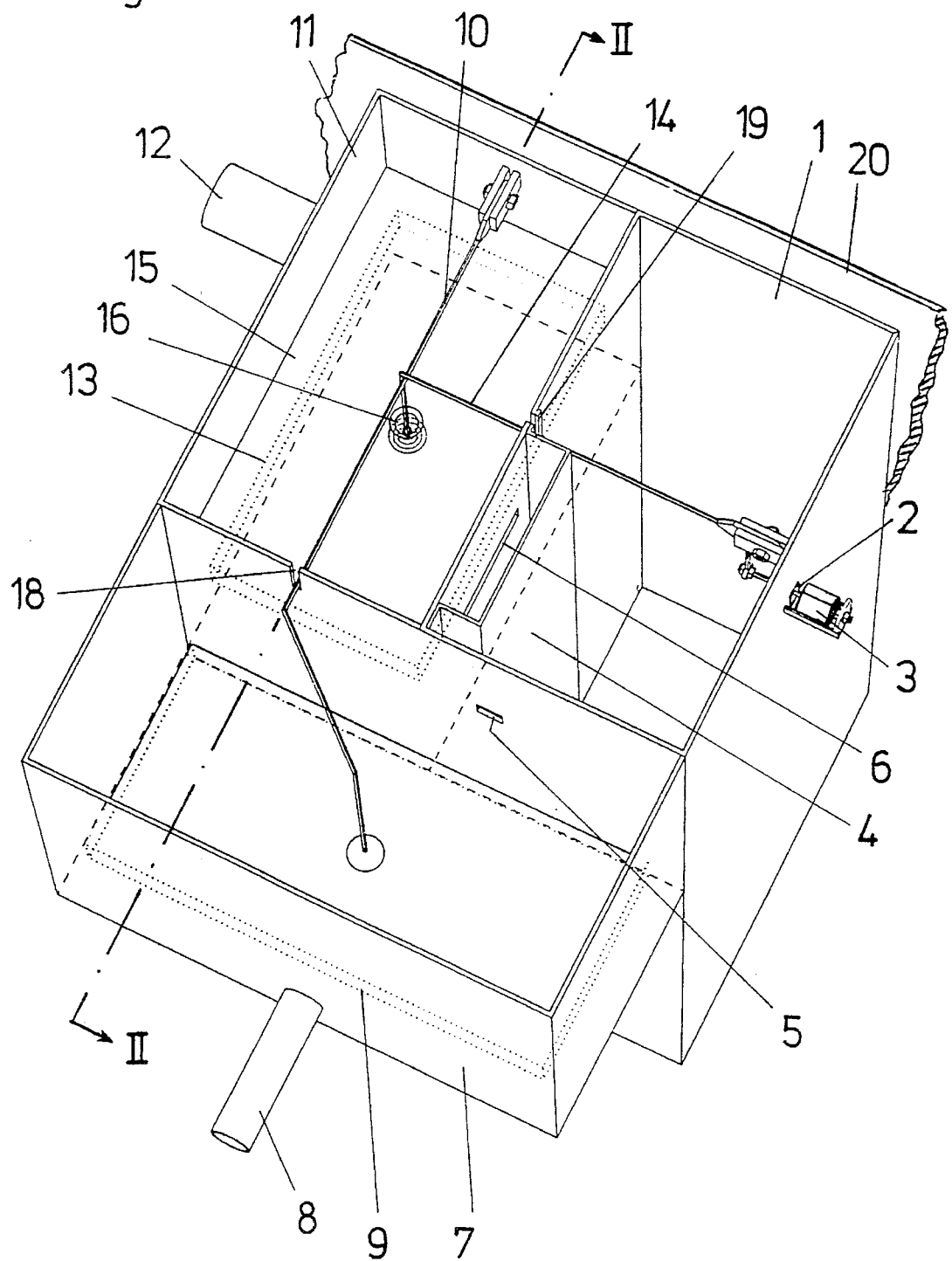

United States Patent [19]

Ortner

[11] Patent Number: 5,622,619
[45] Date of Patent: Apr. 22, 1997

[54] LIGHT LIQUID OFF-TAKE SYSTEM FOR A SEPARATOR BASIN

[76] Inventor: Heinrich Ortner, Mühlgasse 21, A-9900 Lienz, Austria

[21] Appl. No.: 448,445

[22] PCT Filed: Sep. 16, 1994

[86] PCT No.: PCT/AT94/00133

§ 371 Date: Jun. 5, 1995

§ 102(e) Date: Jun. 5, 1995

[87] PCT Pub. No.: WO95/09684

PCT Pub. Date: Apr. 13, 1995

[30] Foreign Application Priority Data

Oct. 5, 1993 [AT] Austria ................... 1995/93

[51] Int. Cl.[6] ............ B01D 17/025; B01D 17/032
[52] U.S. Cl. ............ 210/125; 210/128; 210/519; 210/540
[58] Field of Search ............ 210/123, 125, 210/128, 519, 540, 521

[56] References Cited

U.S. PATENT DOCUMENTS

| | | | |
|---|---|---|---|
| 787,365 | 4/1905 | Franey | 210/123 |
| 1,252,099 | 1/1918 | Donovan | 210/123 |
| 1,576,930 | 3/1926 | Perry | 210/125 |
| 2,826,306 | 3/1958 | Burns | 210/128 |
| 3,971,719 | 7/1976 | Peters | 210/540 |
| 4,436,630 | 3/1984 | Anderson | 210/123 |
| 5,151,185 | 9/1992 | Hammerschmitt | 210/540 |

FOREIGN PATENT DOCUMENTS

| | | |
|---|---|---|
| 393670 | 11/1991 | Austria . |
| 394846 | 6/1992 | Austria . |
| 0368084 | 5/1990 | European Pat. Off. . |
| 598260 | 12/1925 | France . |
| 2838559 | 3/1980 | Germany . |
| 2951205 | 7/1981 | Germany . |
| 3628437 | 2/1988 | Germany . |
| 4110091 | 11/1991 | Germany . |

*Primary Examiner*—Christopher Upton
*Attorney, Agent, or Firm*—Lorusso & Loud

[57] ABSTRACT

Proposed is a light-liquid offtake system designed for installation in a separator basin, the device having a separator tank with an inlet port for the liquid mixture to be separated, an overflow port for light liquid, an overflow port for water, a collector tank for the light liquid and a collector tank for the water. Both tanks contain a float. When the level in a tank exceeds a predetermined limit, the floats actuate closure devices fitted to close off the separator-tank inlet port and prevent water flowing back into the separator tank.

8 Claims, 2 Drawing Sheets

LIGHT LIQUID OFF-TAKE SYSTEM FOR A SEPARATOR BASIN

The present invention relates to an off-take system for the separator basin of a light liquid separator, with a separator container, the upper area of which incorporates an inlet opening for the liquid mixture that is to be cleaned, an overflow opening for light liquid, and an overflow opening for water.

An oil off-take system of this kind, which can be incorporated into a light liquid separator, is described, for example, in AT-B 394 846. In this, the lower edge of the water overflow opening is located lower down than the lower edge of the oil overflow opening, the water overflow opening being separated from the remainder of the container by a baffle that reaches almost to the bottom of the container. Thus, only water can emerge from the water overflow opening and water-free oil passes out through the oil overflow opening as soon as the layer of oil has reached a thickness that corresponds to the difference in level of the two lower edges of the openings. The water-free oil flows into a collector and the oil-free water flows into the separator, from which, in the usual way, it passes into the channel or the like. Any disruption of the run-off means that the level of liquid in the off-take system rises which can result in an overflow and remixing of the light liquid with the water.

Float-operated inlet shut-off valves in the separator itself are described in DE-A 41 10 091 and in AT-B 393 670. In both cases, the opening of the intake pipe is closed off by a valve in the separator chamber.

It is the task of the present invention to avoid malfunctions in an off-take system of this kind if the removal of the light liquid and/or the removal of the water is disrupted, and to this end it proposes that at least one of the two overflow openings has an associated collector with a float; and that a closing system that is operated by a float in the collector tank is provided at the inlet opening into the separator container.

Thus, the in-flow is shut off as a function of the level of liquid in the collector tank so that the liquid in the separator tank is not affected by the float.

A first preferred embodiment makes provision such that each overflow opening has an associated collector tank; and that between the float and the closing system there is an operating linkage.

A further preferred embodiment makes provision such that the operating linkage for the float in the water collector tank activates the closing system and the operating linkage for the float in the light liquid collector tank acts on the operating linkage of the float in the water collector tank. Despite the selective operation by the particular rising float in each instance, a simple closing system for the inlet opening that has a single operating possibility can be used for the inlet opening.

If the collector tank for water has a drain into the separator, in another preferred embodiment, a build-up through the drain is prevented in that a second closing system that is operated by the float is associated with the drain of the water collector tank, and this functions as a water non-return valve.

It is preferred that the water collector tank be divided into two chambers by an intermediate bottom in which there is an opening. In this embodiment, the lower chamber contains the float and has in its top a shut-off element of the second closing system as a non-return valve for the upper chamber and thus for the separator container, so that when the float rises the opening is closed at the same time as the inlet.

Figure 2:
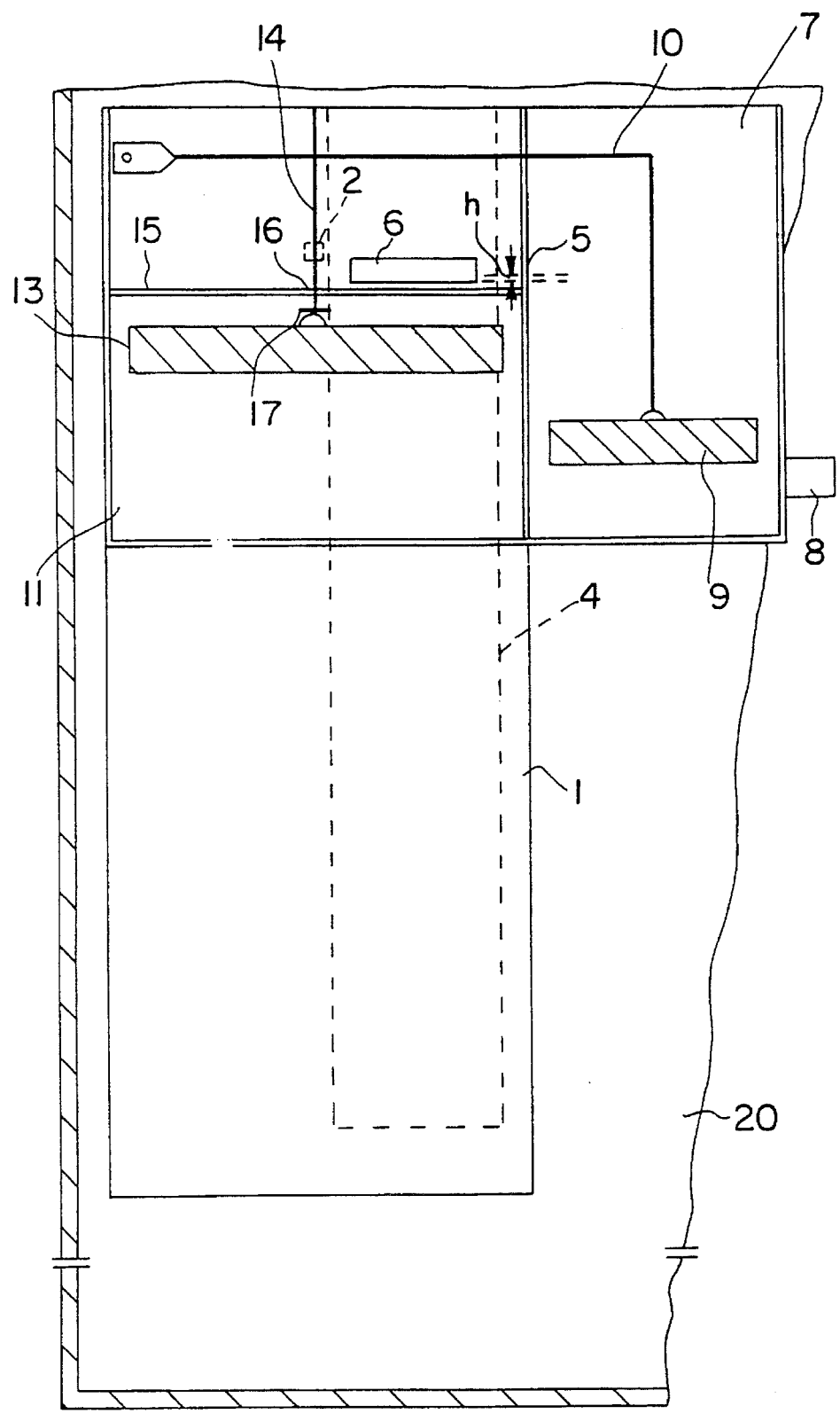

The present invention will be described in greater detail below on the basis of the figures appended hereto, without necessarily being confined thereto. These drawings show the following:

FIG. 1: a perspective view of an off-take system according to the present invention;

FIG. 2: a vertical cross-section on the line II—II in FIG. 1.

An off-take system that can be incorporated into a separator basin 20 of a light liquid separator incorporates a separator tank 1 in which there is an inlet opening 2, a light liquid overflow opening 5 and a water overflow opening 6. A partial space within the separator tank 1 that contains the water overflow opening 6 is divided off from the remaining space by a baffle 4 that extends down to the vicinity of the bottom of the separator tank 1. Thus, only water enters the partial space since the lighter light liquid, which collects on the surface, in particular oil, cannot pass under the baffle 4. As can be seen principally from FIG. 2, the lower edge of the water overflow opening 6 is deeper by a distance h than the lower edge of the light liquid overflow opening 5 so that water cannot pass through the light liquid overflow opening 5. The layer of light liquid that forms on the surface of the water is thus of a thickness h. A light liquid collector tank 7 and a water collector tank 11 are arranged on the separator tank 1 and each of these has a drain 8, 12 and a float 9, 13. The float 9 of the light liquid collector tank 7 has a linkage 10 that extends upwards and then horizontally through a slot 18 in the intermediate wall of the water collector tank 11 and this articulated on an opposite wall of the water collector tank 11 (or of the separator tank 1). The float 13 of the water collector tank 11 also has a linkage 14 that extends upwards, then horizontally through a slot 19 in the intermediate wall of the separator tank 1 that faces the inlet opening 2, and this activates a closing system 3 that is associated on the outside of the inlet opening 2, which it does by way of a rod. The horizontal section of the linkage 10 thus lies below the horizontal section of the linkage 14. If the level in the light liquid collector tank 7 rises above a pre-set level, the float 9 lifts the linkage 14 by way of the linkage 10 and this presses the closing device 13 onto the inlet opening 2 from the outside and thereby closes this. If the water level in the water collector tank 11 rises above a specific level, the float 13 will only lift the linkage 14 and this once again operates the closing device 3. In both cases, the in-flow is interrupted until the fault in the drains 8, 12 is rectified. Since the water drain 12 opens out into the separator basin 20 of the light liquid separator, which could result in a back-up that could lead to a similar increase in the water level in the separator tank 1 so that water could pass through the light liquid overflow 5 into the light liquid connector tank, the water collector tank 11 is divided by means of an intermediate bottom 15 in which there is an opening 16. The float 13 is arranged in the lower chamber that also incorporates the water drain 12 and the linkage 14 extends through the opening 16. The upper side of the float 13 also supports a second closing device 17 in the form of a shut-off element that closes the opening 16, that presses against the opening 16 if the water rises in the lower chamber and thus functions as a non-return valve that functions simultaneously with the in-flow shut-off.

I claim:

1. An off-take system for a separator basin for separating a liquid mixture that is to be cleaned, said liquid mixture comprising a light liquid and water, said system comprising:

a separator tank, the upper region of said separator tank having an inlet opening for receiving said liquid mixture, said inlet opening further including a closing device, said separator tank further including a light liquid overflow opening for transferring said light liquid and a water overflow opening for transferring said water;

a water collector tank in fluid connection with said water overflow opening for receiving said water; said collector tanks each further including a float and operating linkage, wherein each float mechanically cooperates with said operating linkage, and wherein said operating linkage mechanically cooperates with the closing device of said inlet opening.

2. An off-take system as defined in claim 1 wherein said operating linkage connected to said float in said water collector tank activates the closing device, and wherein said operating linkage connected to said float in the light liquid collector tank acts on the operating linkage of the said float in said water collector tank.

3. An off-take system as defined in claim 3 wherein said water collector tank for collecting water has an overflow into the separator basin, said water collecting tank further including a second closing device that is operated by said float in said water collector tank said closing device operating as a water non-return valve so that water draining out of said water collector tank can not reverse flow into said separator tank.

4. An off-take system as defined in claim 2 wherein said water collector tank is separated by an intermediate bottom thereby defining an upper and a lower chamber, said intermediate bottom incorporating an opening between said upper and lower chambers, said water overflow opening being in fluid connection with said upper chamber, said lower chamber incorporating a float and a water overflow, the upper side of said float further including a shut-off element for operating as a non-return valve whereby water can not reverse flow into said separator tank.

5. A light liquid off-take system for a separator basin of a light liquid separator having an inlet for a light liquid-water mixture and an outlet for water, said off-take system comprising:

a separator tank mounted within said separator basin, said separator tank defined in part by an upper area, said upper area having an inlet opening for receiving said light liquid-water mixture that is to be separated, said light liquid-water mixture having been collected in said separator basin, said separator tank further including an overflow outlet opening for light liquid, and an overflow outlet opening for water;

a light liquid collector tank positioned downstream from said overflow outlet opening for light liquid, said light liquid collector further including a first float;

a water collector tank positioned downstream from said overflow outlet opening for water, said water collector tank having a water drain opening into said separator basin, said water collector tank further including a second float; and, a closing device arranged on said inlet opening of the separator tank, said closing device being operated by operating linkage, said operating linkage in mechanical cooperation with each of said first and second floats when rising.

6. An off-take system as defined in claim 5 wherein the operating linkage of said float within the water collector tank activates the closing device and the operating linkage of said float of the light liquid collector tank acts on the operating linkage of the float within the water collector tank.

7. An off-take system as defined in claim 5 wherein the collector tank for water includes a water drain extending into said separator basin, and a water non-return valve, said water non-return valve being operated by said second float in said water collector tank and being arranged so that water drains into the separator basin.

8. An off-take system as defined in claim 7 wherein said water collector tank is divided into an upper chamber and a lower chamber by an intermediate bottom having an opening into said lower chamber, said upper chamber being downstream of said overflow opening for the water, said lower chamber being provided with said second float and said water drain into the separator basin, and said second float having an upper side comprising said non-return valve in sealing cooperation with said opening in said intermediate bottom.

\* \* \* \* \*

UNITED STATES PATENT AND TRADEMARK OFFICE
CERTIFICATE OF CORRECTION

Patent No.: 5,622,619

Issued: April 22, 1997

Inventor(s): Ortner, H.

It is certified that error appears in the above-identified patent and that said Letters Patent is hereby corrected as shown below:

Column 3, Line 1: Before "a water collector tank", insert -- a light liquid collector tank in fluid connection with said light liquid overflow opening for receiving said light liquid; --.

Signed and Sealed this

Ninth Day of September, 1997

*Attest:*

BRUCE LEHMAN

*Attesting Officer*  *Commissioner of Patents and Trademarks*